(12) United States Patent
Schreiber et al.

(10) Patent No.: US 6,891,573 B2
(45) Date of Patent: May 10, 2005

(54) METHOD AND APPARATUS FOR CHANGING THE OUTPUT DELAY OF AUDIO OR VIDEO DATA ENCODING

(75) Inventors: Ulrich Schreiber, Garbsen (DE); Stephane Chouquet, Acigne (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 747 days.

(21) Appl. No.: 09/818,231

(22) Filed: Mar. 27, 2001

(65) Prior Publication Data
US 2001/0026327 A1 Oct. 4, 2001

(30) Foreign Application Priority Data
Mar. 29, 2000 (EP) .......................................... 00400854

(51) Int. Cl.$^7$ .............................................. H04N 9/475
(52) U.S. Cl. ...................... 348/518; 348/512; 348/515; 375/240.27; 386/98; 370/503; 370/537; 370/539
(58) Field of Search ................................ 348/512, 515, 348/516–519; 375/240.27; 386/33, 65, 95, 98, 109, 111, 112; 370/503, 537–538; H04N 9/475

(56) References Cited
U.S. PATENT DOCUMENTS 5,467,139 A * 11/1995 Lankford ..................... 348/512
5,565,923 A * 10/1996 Zdepski ................. 375/240.26
5,566,174 A * 10/1996 Sato et al. ................... 370/468

(Continued)

FOREIGN PATENT DOCUMENTS

WO  WO 96/08115  3/1996  ............ H04N/7/62
WO  WO 99/37048  7/1999  ............ H04J/3/24

OTHER PUBLICATIONS

C. T. Cartwright, "Issues in Multiplex and Service Management in Digital Multichannel Broadcasting", International Broadcasting Convention, GB, London, Sep. 12–16, 1997, pp. 308–313, Conference Publication No. 447.
European Search Report dated: Aug. 28, 2000.

*Primary Examiner*—Brian P. Yenke
(74) *Attorney, Agent, or Firm*—Joseph S. Tripoli; Ronald H. Kurdyla; Guy H. Eriksen

(57) ABSTRACT

For TV broadcasting purposes encoding systems with related video encoders and audio encoders are used. The audio and video delay are aligned before multiplexing and transmitting the audio and video streams. According to a time stamping mechanism input time stamps are generated which become linked with data to be encoded, and are replaced before output by output time stamps, which are derived from the input time stamps by using a data delay constant. The input time stamps are used to control the delay of the encoding process and the output time stamps are indicating the output time. In order to allow a switchable out-put delay the data delay constant can be changed. Already assigned output time stamps remained unchanged. For data for which output time stamps are not already assigned, the out-put time stamps are calculated using the new delay constant.

10 Claims, 2 Drawing Sheets

U.S. PATENT DOCUMENTS

| | | | | |
|---|---|---|---|---|
| 5,694,174 A | * | 12/1997 | Suzuki | 348/518 |
| 5,793,425 A | * | 8/1998 | Balakrishnan | 375/240.25 |
| 5,862,140 A | * | 1/1999 | Shen et al. | 370/468 |
| 5,913,031 A | * | 6/1999 | Blanchard | 709/204 |
| 5,990,967 A | * | 11/1999 | Kawakami et al. | 348/500 |
| 6,031,960 A | * | 2/2000 | Lane | 386/68 |
| 6,052,384 A | * | 4/2000 | Huang et al. | 370/468 |
| 6,101,195 A | * | 8/2000 | Lyons et al. | 370/498 |
| 6,115,531 A | * | 9/2000 | Yanagihara | 386/67 |
| 6,351,281 B1 | * | 2/2002 | Cooper | 348/192 |
| 6,429,902 B1 | * | 8/2002 | Har-Chen et al. | 348/518 |
| 6,438,139 B1 | * | 8/2002 | Huang et al. | 370/468 |
| 6,490,250 B1 | * | 12/2002 | Hinchley et al. | 370/232 |
| 6,516,002 B1 | * | 2/2003 | Huang et al. | 370/468 |
| 6,542,550 B1 | * | 4/2003 | Schreiber | 375/240.26 |
| 6,570,888 B1 | * | 5/2003 | Huang et al. | 370/468 |
| 6,584,125 B1 | * | 6/2003 | Katto | 370/537 |
| 6,611,624 B1 | * | 8/2003 | Zhang et al. | 382/232 |
| 6,658,160 B1 | * | 12/2003 | Winter et al. | 382/245 |
| 6,744,815 B1 | * | 6/2004 | Sackstein et al. | 375/240 |
| 6,806,909 B1 | * | 10/2004 | Radha et al. | 348/384.1 |
| 6,836,295 B1 | * | 12/2004 | Cooper | 348/515 |
| 2002/0159523 A1 | * | 10/2002 | Wang et al. | 375/240.05 |

* cited by examiner

METHOD AND APPARATUS FOR CHANGING THE OUTPUT DELAY OF AUDIO OR VIDEO DATA ENCODING

FIELD OF THE INVENTION

The invention relates to a method for changing the output delay of audio or video data encoding and to an apparatus for changing the output delay of audio or video data encoding.

BACKGROUND OF THE INVENTION

Encoding systems with related video encoders and audio encoders are used for various applications, e.g. for TV broadcasting purposes. In this case the video encoders can have variable encoding delay of up to 1.5 sec, depending for example upon the selected bit rate. Therefore, the audio and video delay should be aligned before multiplexing and transmitting the audio and video streams, because of buffer limitations in the decoders of consumer products.

A basic mechanism for controlling delay within the audio encoder by help of a time stamping mechanism can be found in the European patent application 99250009. In a multi-channel audio encoder board input time stamps are generated which become linked at least in one input processing stage with frames of audio data to be encoded, wherein the input time stamps or time stamps derived from the input time stamps remain linked with the correspondingly processed frame data in the different processing stages in the processing, but are at least in the last processing stage replaced by output time stamps. In each of theses stages the corresponding time stamp information linked with current frame data to be processed is regarded in order to control the overall delay of the processing.

In order to allow switchable bit rates for the video and audio encoders on operators choice, for example for making space for an additional TV channel, a switchable delay of the audio encoder is desireable. However, the European patent application 99250009 does not disclose, how such delay changes might be handled.

SUMMARY OF THE INVENTION

It is one object of the invention to disclose a method for changing the output delay of audio or video data encoding, particularly for the purpose of switchable bit rates for the video and audio encoders on operators choice. This object is achieved by the method disclosed in claim 1.

It is a further object of the invention to disclose an apparatus for changing the output delay of audio or video data encoding which utilises the inventive method. This object is achieved by the apparatus disclosed in claim 7.

In principle, according to the inventive method input time stamps are generated which become linked with audio or video data to be encoded and are used to control the delay of the encoding process. Output time stamps are derived from the input time stamps by using a data delay constant and are assigned to the encoded data for indicating the output time. The encoded data with assigned output time stamps are buffered before output, wherein for a change of the output delay the data delay constant is changed. Already assigned output time stamps remain unchanged. For data for which output time stamps are not already assigned, the output time stamps are calculated using the new data delay constant.

Advantageous additional embodiments of the inventive method are disclosed in the respective dependent claims.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
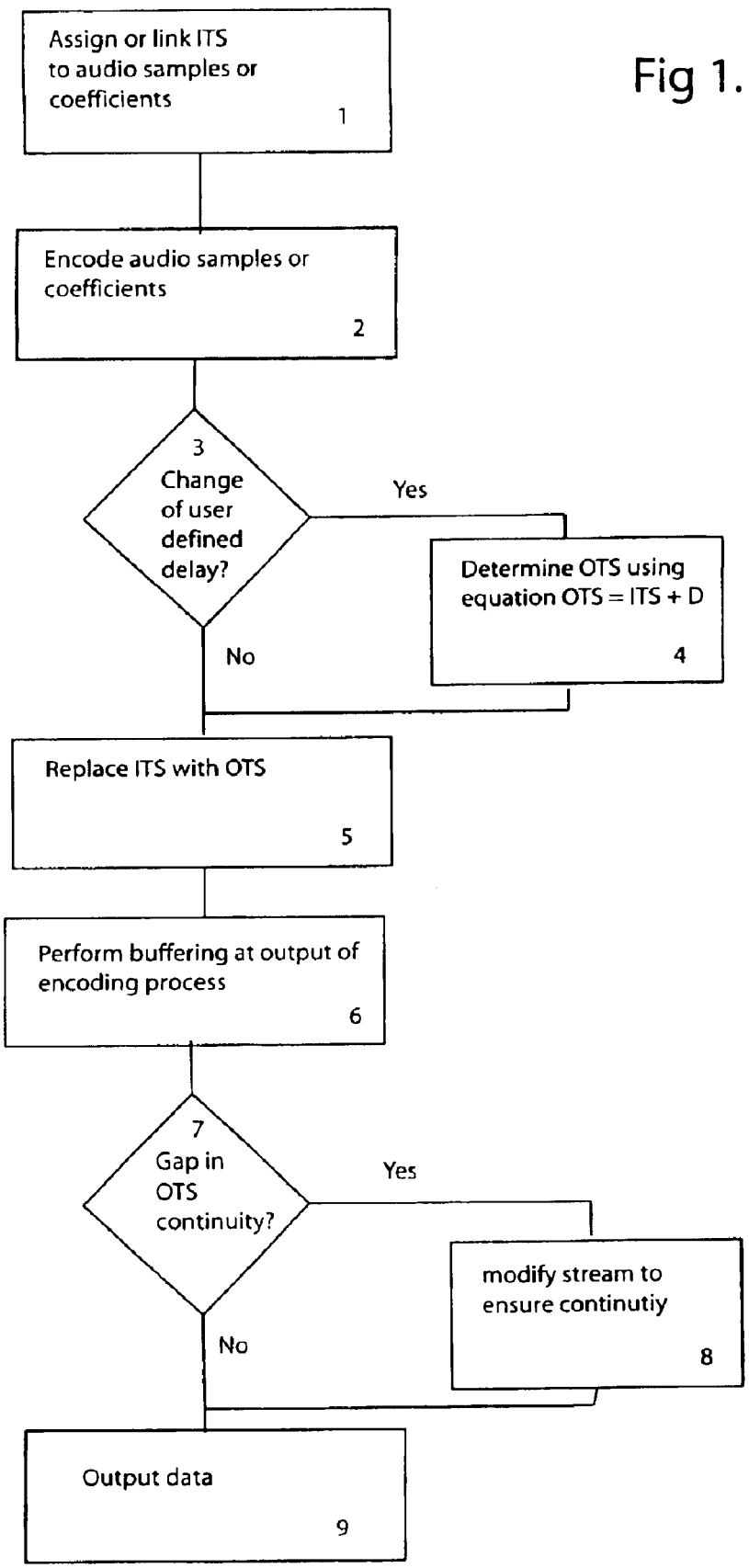
FIG. 1 a schematic flow chart of the method for changing the output delay.

FIG. 1 shows a schematic flow chart of the method for changing the output delay. To audio samples or audio coefficients an input time stamp information ITS is linked or assigned in the first method step 1. Then the audio samples or audio coefficients are encoded in method step 2. In method step 3 it is checked, whether a change of the user-defined delay D is requested. If so, the processing equation for the output time stamps OTS=ITS+D is changed in method step 4. The input time stamp information ITS is then replaced by the output time stamps OTS in method step 5 before buffering in method step 6. The buffering is performed at the output of the encoding process, as the amount of memory required is lower at this side. Thus input data will typically be immediately encoded when received by the audio encoder, and be put after encoding into the delay buffer, especially in form of transport stream packets.

Before sending the data to the output in method step 9, the OTS are checked in method step 7. If a gap in the OTS continuity occurs, stuffing data or zero data are inserted in method step 8. If on the other hand two packets with same or overlapping OTS are found in the delay buffer, this also requires a special treatment in method step 8. One possibility is to discard packets indicating output times that are already passed. One other possibility to handle this case is to write no further data into the output delay buffer beginning with the change request for the difference time, and to use the new delay time for the OTS calculation for all following packets. Finally, the data are sent to the output in method step 9.

In the following the treatment of the data, especially in method step 8, is described in more detail for an example delay increase or reduction, respectively, of 0.3 sec and an initial delay of 0.5 sec.

For delay increase the delay buffer contains a certain amount of data equal to the presently effective delay time of 0.5 sec and this amount of data shall be increased to 0.8 sec. This implies, that the output of encoded data from the delay buffer effectively needs to be stopped for 0.3 sec while data input to the delay buffer is continued.

The data in the delay buffer are already encoded data representing the continuation of the delay buffer already output just before. Therefore, the delay buffer is managed in the way, that after the change request for the delay time, the delay buffer continues to deliver data for 0.5 sec until all data that were in the delay buffer at the time of the delay time change are completely output. Then the output from the delay buffer is stopped, implying that either stuffing, zero data or no packets are sent to the transmitter/decoder chain. The stop then will last for a time of 0.3 sec, which is required to increase the delay buffer contents accordingly.

This behavior can be accomplished by use of the above mentioned time stamp based delay control mechanism. All output blocks, i.e. TS packets, that reside in the delay buffer at a given time are also stamped with an output time stamp that indicates the point in time when the packet should be sent out of the delay buffer and afterwards to the transmitter.

Nothing needs to be changed for the packets that are already in the delay buffer, they are output as intended at their generation time. Immediately at the time where the audio delay D is changed, either directly or indirectly by operator, the processing equation for the output time stamps OTS= ITS+D is changed, i.e. all OTS time stamps are increased by 0.3 sec. All packets computed with the "old" delay are output orderly one after another by the output stage from the delay buffer. Then, after 0.5 sec, there will be a gap in the OTS continuity, i.e. the next packet will indicate an OTS that is indicating a time increased by 0.3 sec than the packet would have had without a delay change. The output stage then can send stuffing or zero data or even no packets.

Thus the net effect of delay increase for the user, i.e. the consumer listening at the decoder side, will be, that after the delay change request the audio program does continue normal for the present effective delay time of 0.5 sec, the audio program shortly mutes for 0.3 sec, and the program continues normally with the new delay of 0.8 sec.

On the operator side, upon delay change request the following happens all program parts already input to the encoder will be sequentially delivered to the user, all audio program parts input after the delay switch will be separated by a short break from the previous parts on the user side.

The operator could use a program gap or the moment of a switch between distinct program parts for the delay time change in order to achieve a minimum irritation for the user.

Also at delay reduction the delay buffer contains a certain amount of data. The delay shall now be reduced from 0.5 sec to 0.2 sec delay. In this case, it will be necessary to normally continue the outputting process for 0.3 sec, while stopping the write of further input data into the delay buffer. Thus a short time of program material available at the input of the encoder will not be sent to the user. In principle the audio program at the user side could be continuous but a short piece would be cut out of the signal.

The delay reduction can be accomplished by the same time stamp based delay control. Immediately after the audio delay change request, the output time stamp OTS calculation is changed in a way, that the OTS indicate a point in time earlier by 0.3 sec then without the delay change.

If the writing of data packets into the delay buffer is continued, this would result in finding two packets with same or overlapping OTS in the delay buffer. As the packets are ordered in the delay buffer, output of the "old" packets before the audio delay change request would be continued normally, until all data that were in the delay buffer at the time of change request are output. Then the next packets will indicate for 0.3 sec output times OTS that are already passed, so the output driver stage will have to discard these packets.

Another method to handle this case is to write no further data into the output delay buffer beginning with the change request for the difference time of 0.3 sec, and to use the new delay time for the OTS calculation for all following packets In this case, the output stage of the encoder will find a more or less continuous OTS sequence.

Thus the net effect of delay reduction for the user (consumer listening at the decoder side) will be, that after the delay change request the audio program does continue normally for the present delay time of 0.5 sec, then the program continues normally with the new delay of 0.8 sec, but with a delay difference of 0.3 sec of audio program skipped.

On the operator side, upon change request the following happens all program parts already input to the encoder will be sequentially, i.e. normally delivered to the user, the program material supplied to the encoder immediately after the change request for a following time period equal to the delay time difference of 0.3 sec will not be audible at the user side, after this time period of 0.3 sec all audio program parts input to the encoder will be normally audible at the user side.

Thus, the operator could use a program content switch to change delay time, and simply delay start of the next program by the delay time difference in order to guarantee that nothing of the program is lost for the listener.

All discontinuities of the audio program, that become audible to the listener, might be optionally softened by the encoder, i.e. proper fade in and out. Delay increase: fade out before the gap, fade in after the gap. Delay reduction: fade out before skipped part, fade in after that. In case of doing the delay changes together with audio program switches, this might not be necessary, because the audio programs will contain this switch.

Figure 2:
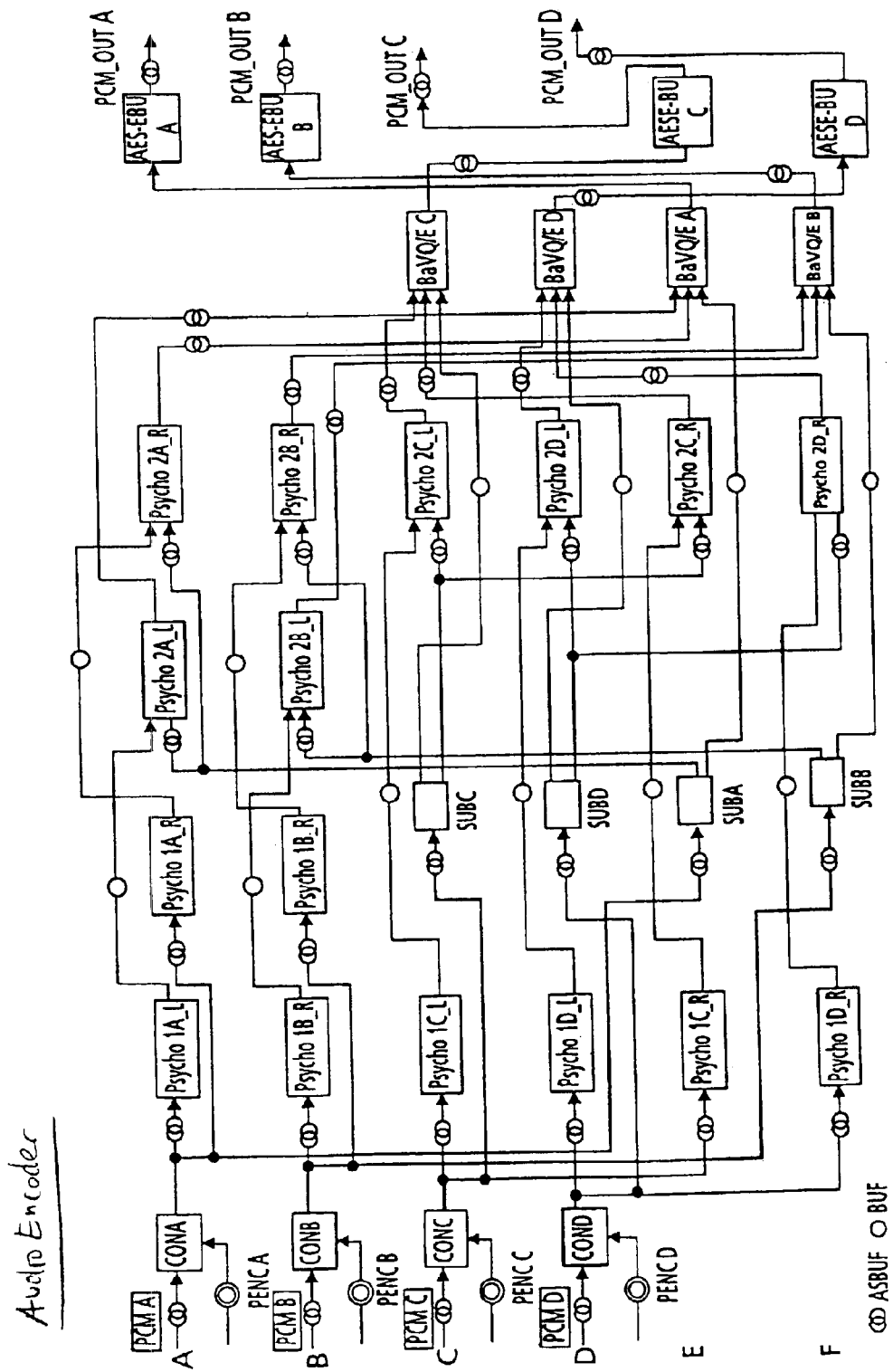
FIG. 2 a functional block diagram of a 4-channel audio encoder using the inventive method.

The inventive method can be used in an audio encoder as shown in FIG. 2. The encoder receives four stereo PCM input signals PCMA, PCMB, PCMC and PCMD. E.g. MPEG audio data are frame based, each frame containing 1152 mono or stereo samples. The encoder operating system of FIG. 2 may include six DSPs (not depicted) for the encoding of the four MPEG channels. These DSPs form a software encoder which includes the technical functions depicted in FIG. 2. A suitable type of DSP is for example ADSP 21060 or 21061 or 21062 of Analogue Devices. As an alternative, the technical functions depicted in FIG. 2 can be realised in hardware.

Synchronisation of the software running on the six DSPs, or on corresponding hardware, is achieved using FIFO buffers wherein each buffer is assigned to one or some specific frames. This means that at a certain time instant a current frame as well as previous frames, the number of which depends from the quantity of available buffers, are present in the processing stages.

Between some of the stages asynchronous buffers ASBUF are inserted which allow asynchronous write and read operations. Between other stages synchronous buffers BUF are sufficient. The PCM input signals PCMA, PCMB, PCMC and PCMD each pass via an asynchronous buffer to a respective converter CONA, CONB, CONC and COND. In such converter an integer-to-floating representation conversion of the audio samples to be encoded may take place. It is also possible that the encoder processes integer representation audio samples. In such converter also one or more kinds of energy levels in a frame may be calculated, e.g. energy of all samples of the frame or average energy of the samples of a frame. These energy values may be used in the subsequent psychoacoustic processing.

In addition, in such converter the possibly adapted encoding parameters can become linked with the frame audio data In respective parameter encoders PENCA, PENCB, PENCC and PENCD the original encoding parameters may be converted as described above and then fed to CONA, CONB, CONC and COND, respectively.

Via asynchronous buffers the output data of CONA, CONB, CONC and COND are fed in parallel to subband filters SUBA, SUBB, SUBC and SUBD and to first left and right channel psychoacoustic calculators Psycho1A_L, Psycho1A_R, Psycho1B_L, Psycho1B_R, Psycho1C_L, Psycho1C_R, Psycho1D_L and Psycho1D_R, respectively. The subband filters divide the total audio spectrum into frequency bands, possibly using FFT, and may calculate the maximum or scale factor of the coefficients in a frequency band or subband. Within the frequency bands a normalisation may be carried out. The subband filters take into account the above time stamp information and possibly the relevant encoding parameters read from the corresponding upstream asynchronous buffer.

The first psychoacoustic calculators perform an FFT having a length of e.g. 1024 samples and determine the current masking information. Each first psychoacoustic calculator can be followed by a second psychoacoustic calculator Psycho2A_L, Psycho2A_R, Psycho2B_L, Psycho2B_R, Psycho2C_L, Psycho2C_R, Psycho2D_L and Psycho2D_R, respectively, which evaluates the maximum or scale factor values previously calculated in the subband filters. The first and second psychoacoustic calculators take into account the above time stamp information and possibly relevant encoding parameters read from the corresponding upstream asynchronous buffers.

The output signals of Psycho2A_L, Psycho2A_R, Psycho2B_L, Psycho2B_R, Psycho2C_L, Psycho2C_R, Psycho2D_L and Psycho2D_R are used in bit allocators and quantisers Bal/Q/E_A, Bal/Q/E_B, Bal/Q/E_C and Bal/Q/E_D, respectively, for determining the number of bits allocated and the quantisation the audio data coefficients coming from the associated subband filter via a buffer. It is also possible to calculate in the second psychoacoustic calculators in addition what is being calculated in the first psychoacoustic calculators and thereby to omit the first psychoacoustic calculators.

Finally, the outputs of Bal/Q/E_A, Bal/Q/E_B, Bal/Q/E_C and Bal/Q/E_D pass through an asynchronous buffers and output interfaces AES-EBU_A, AES-EBU_B, AES-EBU_C, AES-EBU_D, respectively, which deliver the encoder stereo output signals PCM_Out_A, PCM_Out_B, PCM_Out_C, PCM_Out_D, respectively. The output interfaces may correspond to IEC 958.

A video encoder includes the following stages: block difference stage, DCT (discrete cosine transform), quantisation and in the feedback loop inverse quantisation, inverse DCT, motion compensated interpolation the output of which is input to the block difference stage, wherein the output of the quantisation is possibly VLC (variable length coding) encoded and buffered before final output and the buffer filling level is used to control the quantisation in such a way that encoding artefacts are masked as far as possible.

In this encoder the following elements are required:
a system time base supplying a system time, that delivers unique values for all comprised input and output stages;
hardware and/or software mechanisms that relates system time base and input data to obtain sufficiently precise input time stamps (ITS);
hardware and/or software mechanisms that relates the system time base with the data output to obtain sufficiently precise output according to the output time stamps (OTS).

These elements are used in the following way:
a) Per input interface of the system, input data are related to the system timer, i.e. an input time stamp ITS along with the incoming data is obtained and assigned to the data frames. For example, the system time of the sampling moment of the first sample of a sampled audio data block or frame is used therefore.

b) In the case of multiple inputs, the input data blocks can be realigned across the channels by the time information given by the input time stamps.
Example 1: multichannel audio inputs distributed over several two-channel interfaces.
Example 2: bitstream outputs of multiple stereo encoders shall be multiplexed into an MPEG TS (transport stream) with a well-defined time relation across the channels, i.e. equal delay possibility.

c) From input time stamps ITS and the intended overall delay D output time stamps OTS for the output data are calculated.
In the easiest processing case where one output data block per input data block is calculated by the system, the intended output time of each output block is given by $OTS(n)=ITS(n)+D$, $n=0, 1, 2 \ldots$ denoting the data block number.
In the case where per input data block several output data blocks or even a non-integer number of output blocks is to be generated, the OTS for each of the output blocks can be interpolated according to the corresponding time ratios. An example is the MPEG encoder 1152 samples input, or an MPEG PES packet with one or more ESPs (elementary stream packets), and the MPEG TS transport stream wherein the packets have a length of 188 Bytes, i.e. for each sample frame 3 to 7 TS packets are required for transmission.

d) Each output interface examines the output data blocks, as supplied to the output buffer by the processing stages, for their related OTS in relation to the present system time as described in detail in the above description of FIG. 1. If OTS is indicating a time instant that has already passed the output data block can be discarded or can be output immediately, depending on the application. If the OTS is pointing to a future time instant the output stage will wait until that time instant has come and during the wait time can either output nothing or a defined filling pattern.

A couple of related mechanisms are available which can be used in different combinations as required for the I/O process to be implemented.

In an example minimum hardware scenario the system makes use of a single hardware timer, which is typically already part of each DSP, in combination with some kind of regular or controlled output driver software activation. The rest of the delay control is then executed by the DSP. In principle two timer functions are required:
A 'getTime( )' function, that allows the software to ask for the actual system time. Upon reception (DMA or INT based) of the beginning or the end of each input data block the getTime( ) function can be used to obtain the ITS for that block.

The output function may need a certain delay before sending an output block for which the corresponding processing has finished. This can either be done in a polling manner, i.e. by cyclic control of the actual system time vs. OTS if some kind of cyclic activation is available, or by a specific timer-based delay function that issues an interrupt after a definable delay 'interruptAfter(DELAY)' or 'threadActivityAfter(DELAY)' function.

The single hardware timer, operating as a backward counter with interrupt at zero, and the input and output DMA block-complete interrupts which are build-in functions of the DSPs, are used.

The single hardware timer can provide the functions 'interruptAfter(DELAY)' and 'getTime( )', wherein for the latter function the subsequent delay times loaded to the timer are summed up to obtain a continuous system time and wherein several 'interruptAfter(DELAY)' functions can run in parallel.

In the case of a multi-DSP system with each DSP implementing it's own timer, but distributing inputs and outputs with delay requirements between them across different DSPs, there is a problem of timer synchronicity. This problem can be solved by a special cyclic interrupt signal (e.g. of 10 ms length) that is applied to all DSPs in the system and that is used to resynchronise the system times. The counter output word may have the format iiii.ffff, wherein iiii is interpreted as integer part and ffff is interpreted as fractional part. Every 10 ms iiii is incremented by '1'. This event is transmitted to the DSPs and is counted therein. The maximum manageable value for DELAY depends on the word length of iiii. Thereby the interrupt indicates the moment of resynchronisation and during the interrupt period a master value iiii for the time is transmitted from one master DSP to all other DSPs. At this time instant ffff is set to zero.

While the delay control described in above example scenario requires minimum hardware only and thus leaves most of the job to (cheaper and more flexible) software, the disadvantage is that the delay time accuracy is limited by e.g. interrupt latency times, maximum interrupt disable times and, in case of a multi-DSP system, bus arbitration delays. If the achieved accuracy is not sufficient, hardware enhancements can be used that make the process of obtaining ITS relative to system time and output at OTS relative to system time more accurate. A combined solution with software determining the rough point in time and special hardware establishing the exact point in time will achieve a compromise between required DSP reaction time (tends to be slow compared to hardware) and hardware complexity (tends to be more complex the longer the time periods are).

A theoretical overflow beginning at the buffers related to the last processing stages and proceeding to the buffers related to the front processing stages is prevented by handshake between the DSPs.

The inventive method for changing the delay can also be applied for single DSP systems and for any other kind of real time processing.

In simplified applications, e.g. in an AC-3 decoder, computing a single data frame after reception with the real time constraint that the processing time for each block must be shorter than the frame period is an often used approach. This approach can be extended to a solution with more distributed processing including splitting into several subsequent processing stages, eventually distributed over several DSPs. In this case each processing stage can be forced into a well defined 'time slot', where for each processing stage the processing time must be shorter than the time slot length. In contrast to the solution described first, instead of a single time constraint there would be one time constraint per time slot/processing stage.

A requirement may be that the encoder is able to operate with different encoding parameters because MPEG allows e.g. various sample frequencies and overall data rates.

The invention has the advantage that the shortest disruption period is ensured, when an operator changes the delay.

The invention can be used to ensure a fixed but variable encoding delay for any variable bit rate encoder or encoder which need a variable processing time.

The invention can especially be used for MPEG 1 2, and 4 Audio encoding and decoding for MPEG layers 1 2, or 3, Digital Video Broadcast DVB, for AC-3, MD and AAC processing, for DVD processing and Internet applications concerning audio data encoding and decoding.

What is claimed, is:

1. Method for aligning first audio data with related second audio or video data before multiplexing, wherein input time stamps are generated which become linked with audio or video data to be encoded and which are used to control the delay of the encoding process, and wherein output time stamps are derived from the input time stamps by using a data delay constant and are assigned to the encoded data for indicating the output time, and wherein the encoded data with assigned output time stamps are buffered before output, characterised in that the output delay of the first audio data is adapted to the output time of the related second audio or video data;

for a change of the output delay said data delay constant is change-already assigned output time stamps remain unchanged; and for data for which output time stamps are not already assigned, the output time stamps are calculated using the new data delay constant.

2. Method according to claim 1, wherein during a gap in the sequence of output time stamps appearing at delay increase, stuffing data or zero data or even no data are sent.

3. Method according to claim 1, wherein for data with same or overlapping output time stamps appearing at delay reduction, the later data indicating output time stamps that are already passed are discarded.

4. Method according to claim 1, wherein for delay reduction no further data are written into output delay buffer beginning with the delay change request for a time duration corresponding to the difference between the old data delay constant and the new data delay constant, and wherein the new data delay constant is used for the calculation of the output time stamps for all following data.

5. Method according to claim 1, wherein discontinuities of the audio or video data are softened by the encoder.

6. Method according to claim 1, wherein discontinuities are softened by fading out before the gap or skipped part and fading in after the gap or skipped part.

7. The method according to claim 1, wherein the output delay is changed upon request of an operator.

8. Apparatus for aligning first audio data with related second audio or video data for common encoding, wherein input time stamps are generated which become linked with audio or video data to be encoded and which are used to control the delay of the encoding process, wherein output time stamps are derived from the input time stamps by using a data delay constant and are assigned to the encoded data for indicating the output time, and wherein the encoded data with assigned output time stamps are buffered before output, characterized in that the apparatus includes:

means for adapting the output delay of the first audio data to the output time of the related second audio or video data, wherein said data delay constant is modified; and means for using the changed data delay constant for the calculation of the output time stamps for following portions of the fist audio data, wherein already assigned output time stamps remain unchanged.

9. Apparatus according to claim 8, wherein the means for changing said data delay constant is utilized upon operator request.

10. Apparatus according to claim 8, wherein for delay reduction no further data is written into the output buffer beginning with the delay change request for a time duration corresponding to the difference between the old data delay constant and the new data delay constant, and wherein the new data delay constant is used for the calculation of the output time stamps for all following portions of the first audio data.

* * * * *